United States Patent
Crane

[15] 3,683,724
[45] Aug. 15, 1972

[54] ATTACHMENTS FOR AUTOMATIC LATHES

[72] Inventor: Brian Crane, 83 Browns Lane, Allesley, Coventry, England

[22] Filed: May 7, 1970

[21] Appl. No.: 35,536

Related U.S. Application Data

[63] Continuation-in-part of Ser. No. 659,051, Aug. 8, 1967, abandoned.

[52] U.S. Cl. ................................82/2.5, 29/38 B
[51] Int. Cl. .................................B23b 15/00
[58] Field of Search ..............82/2.5, 2.7; 29/38.2

[56] References Cited

UNITED STATES PATENTS

| | | | |
|---|---|---|---|
| 2,080,157 | 5/1937 | Yager et al. | 29/38 X |
| 2,779,956 | 2/1957 | Butler et al. | 29/38 X |
| 3,200,472 | 8/1965 | Kohring et al. | 29/38 |
| 3,096,673 | 7/1963 | Spohn et al. | 82/2.5 |
| 3,191,470 | 6/1965 | Pabst et al. | 82/36 A |

Primary Examiner—Leonidas Vlachos
Attorney—Holman & Stern

[57] ABSTRACT

An automatic lathe is provided with an attachment whereby workpieces transferred from main workpiece holders can be machined on their faces which are inaccessible before separation from a bar stock from which they are made, with the attachment having an indexible member movable between a plurality of stations for loading, unloading and at which stations machining operations can be performed.

5 Claims, 4 Drawing Figures

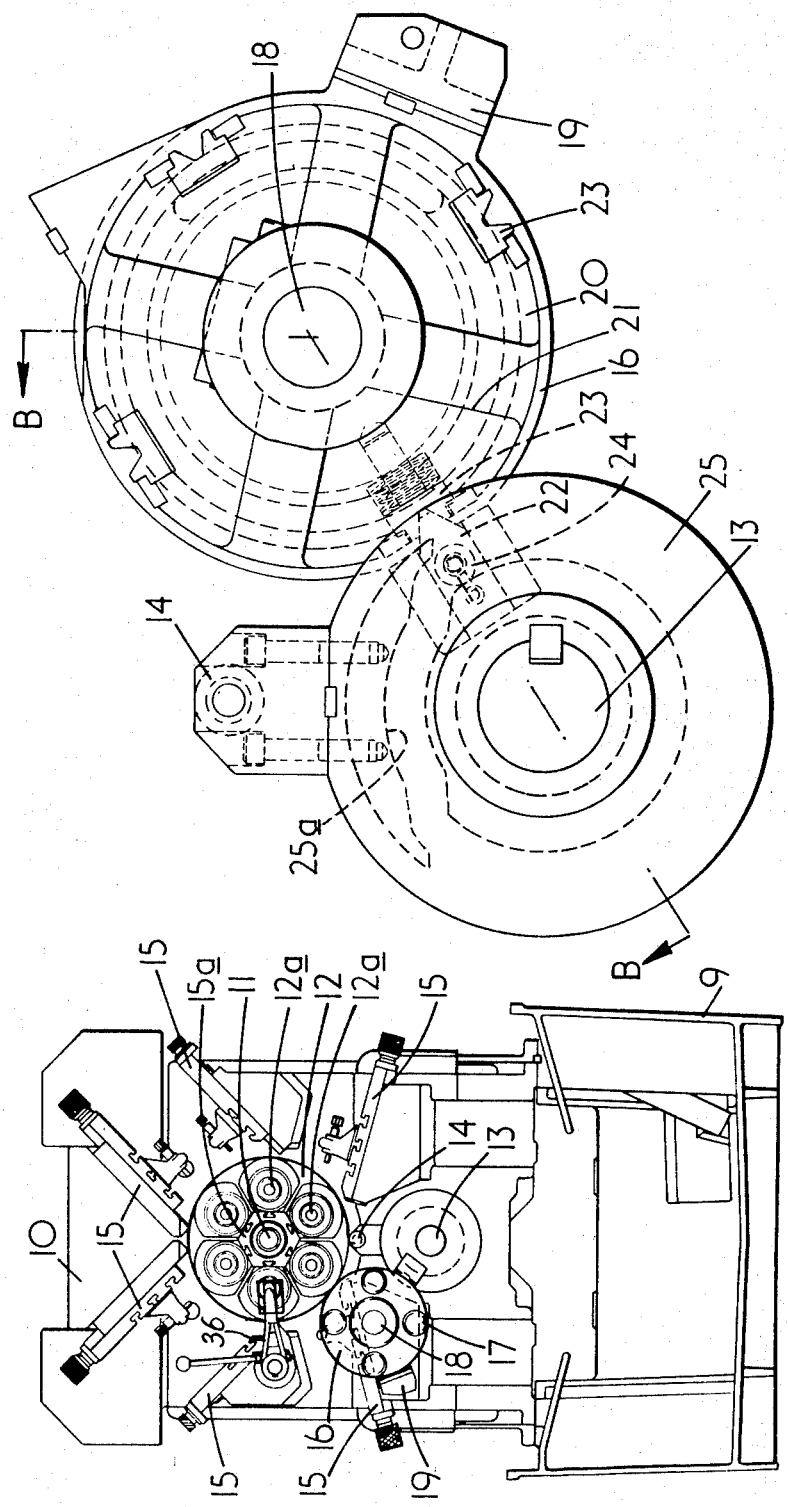

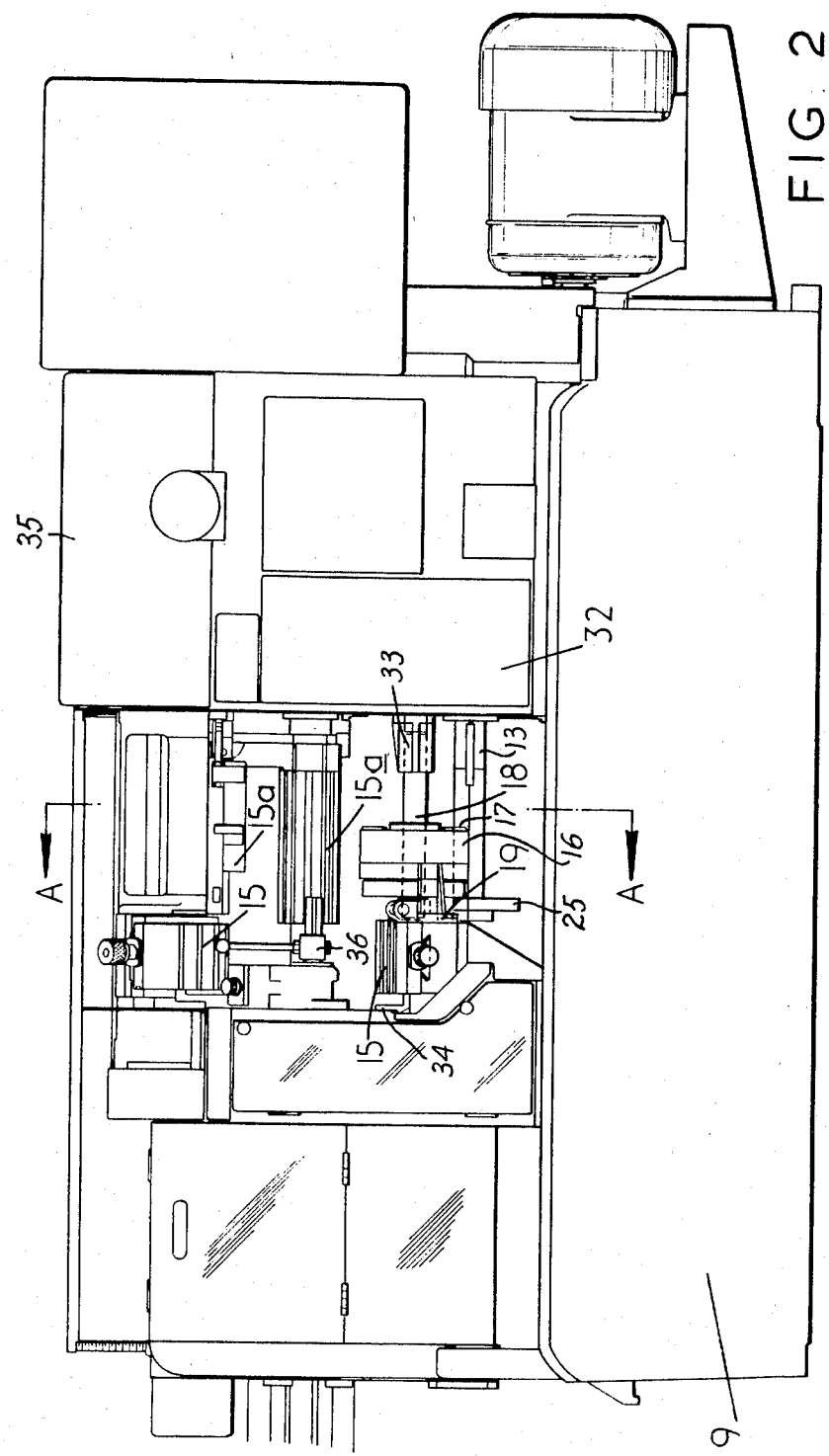

3,683,724

ATTACHMENTS FOR AUTOMATIC LATHES

BACKGROUND OF THE INVENTION

This application is a continuation-in-part of my copending application Ser. No. 659,051 filed Aug. 8, 1967, now abandoned.

The invention relates to attachments for automatic lathes for enabling machining operations to be performed upon the end of a workpiece which only becomes exposed for such operations when it has been parted off from the bar stock, from which it is formed.

Workpieces formed on automatic lathes frequently require more than one operation being performed upon that part thereof which is inaccessible until the workpiece is separated from the bar stock, with an example being the provision of a tapped hole in the end, which requires separate drilling and tapping operations. These operations can, of course, be performed upon another machine, but this is clearly wasteful in time and handling costs, and it is therefore desirable that any such operations should be performed upon the machine which is used to form the remainder of the workpiece. It is, moreover, desirable that apparatus for this purpose should be in the form of an attachment to a substantially standard machine to limit expenditures upon modifications to such a standard machine.

The object of the invention is to provide an attachment for an automatic lathe in which these desiderata can be obtained.

SUMMARY OF THE INVENTION

In accordance with the present invention a combined transfer and attachment device for an automatic lathe having a workpiece holder with at least one gripping device and a main actuating shaft comprises a head, a plurality of workpiece gripping devices on the head, support means securable to a lathe and upon which the head is rotatably mounted, the gripping devices being presented in the same direction as that on the workpiece holder on the lathe, the axis of rotation of the head being parallel to but off-set from that of the lathe workpiece holder, means adapted to be actuated by a main actuating shaft on the lathe for indexing the head about its axis between a plurality of successive positions, and a transfer means for transferring workpieces from the lathe workpiece holder to the head and at the same time turning them so that one or more portions thereof inaccessible for operating thereon when in the lathe workpiece holder, become accessible, when held in the head, for one or more operations to be performed thereupon.

The invention will now be described with reference to the accompanying drawings in which:

BRIEF DESCRIPTION OF THE DRAWINGS

FIG. 1 is a view illustrating the workpiece area of a multi-spindle automatic lathe incorporating the present invention, FIG. 2 is a side elevation view of the machine, FIG. 3 is an enlarged view taken along line A—A of FIG. 2, the view looking in the direction of the arrows.

DETAILED DESCRIPTION OF THE INVENTION

Figure 4:
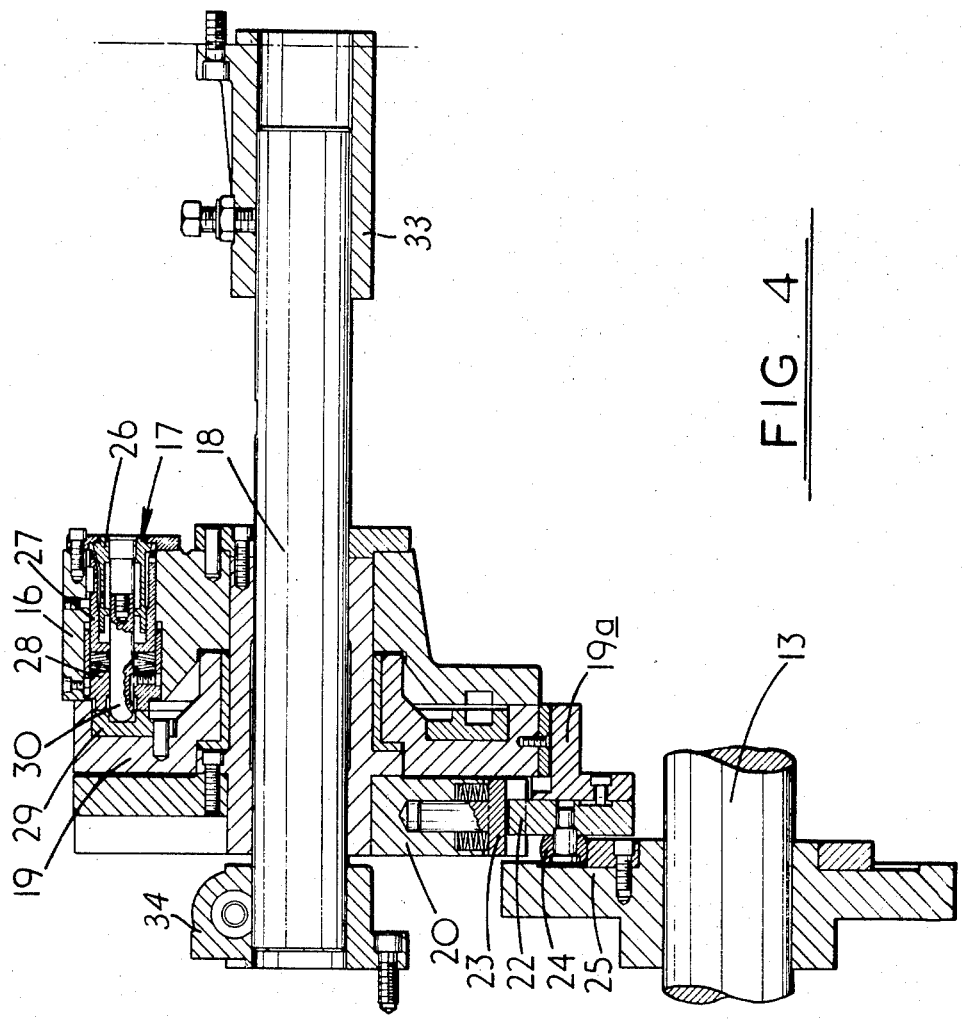
FIG. 4 is an enlarged view taken along line B—B of FIG. 3, the view looking in the direction of the arrows.

Referring to FIGS. 1 and 2, an automatic multi-spindle lathe has a base 9 upon which is mounted a housing 10 in which a spindle is rotatably supported, with the axis of the spindle being indicated 11. The spindle carries a member 12 on which a plurality of chucks 12a are rotatably mounted. The chucks 12a are arranged at equi-angularly spaced positions about the axis 11. This assembly constitutes a workpiece holder and is indexable angularly about the axis 11 between successive stations numbered 1 to 6 respectively in FIG. 1, under the control of a main actuating shaft 13 which is also rotatably mounted in the housing 10.

Mounted upon the machine and surrounding the member 12 of the workpiece holder are a plurality of toolholders 15 usually referred to as slides, six of which are shown. The slides are arranged to move in a plurality of directions respectively towards and away from workpieces carried in the chucks 12a to perform machining operations thereon.

There are also members 15a mounted on the machine and arranged concentrically with respect to the axis 11 to carry tools for endwise working upon the workpieces.

One of the stations which can be occupied by the chucks 12a is arranged for the loading and unloading of the workpieces. The actuating shaft 13 carries cams (not shown) for actuating mechanisms for controlling the movement of the slides 15 as desired. The lathe thus far described is of substantially conventional form, and it is to be understood that the attachment now to be described can be applied to any other automatic multi-spindle or single spindle lathe.

The attachment is intended to perform machining operations upon those portions of workpieces which are inaccessible before the workpiece is separated from the bar stock, and comprises a drum-like workpiece head 16 carrying, in this embodiment, four workpiece gripping devices or chucks 17 which have their open ends presented in the same direction as those of the member 12. The devices 17 are disposed at equi-angularly spaced positions about the axis of the head 16. There is a support bar or shaft 18 for the head 16, which is non-rotatably secured at one end 20 to the housing 10 by means of a bracket 34. The opposite end of the support bar 18 is secured to a part 35 of the machine upstanding from the base 9 by means of a bracket 33, so that the support bar 18 extends parallel to but off-set from the axis 11 of the spindle of the machine.

The attachment has a part 19 non-rotatably mounted about the bar 18 and the head 16 is rotatably mounted on the bar 18. To prevent rotation of the part 19, this part is secured to a support for one of the slides 15. The head 16 is capable of being indexed between four successive positions by means of a geneva wheel mechanism illustrated in FIG. 3 which, illustrates the parts from the opposite direction to that of FIG. 1. The geneva wheel mechanism, which is mounted upon the head 16, comprises four segmental pieces 20 defining therebetween slots 21 into which a roller 14, carried by the actuating shaft 13, can engage to rotate the head 16 through 90°; that is to say one station. It is to be understood that during the normal operation of the machine, the shaft 13 is rotated one complete revolution to index both the member 12 and the head 16 by one station.

There is a locking mechanism for preventing rotation of the head 16 other than when indexing is taking place. This locking mechanism comprises a wedge shaped plunger 22 engageable in any one of four shaped shoes 23 mounted through springs upon the segmental pieces 20 respectively of the geneva wheel mechanism. The plunger 22 is slidably mounted upon an extension 19a of the part 19 and carries a roller 24 which is engageable with a composite face cam 25 mounted upon the main actuating shaft 13. The arrangement is such that when indexing is taking place, the roller 24 follows a track 25a in the face of the cam 25 whereby it is moved inwardly with respect to the axis of the shaft 13. When indexing is complete and the roller 14 is out of engagement with the geneva wheel mechanism, the plunger moves outwardly to engage an appropriate one of the shoes 23, with the plunger being held in this position by engagement of the roller 24 with a part of the cam 25 concentric with the axis of the shaft 13.

As illustrated in FIG. 4 each of the chucks 17 comprises a non-rotatable split collet 26 mounted with respect to an axially spring-loaded sleeve 27. An operating member 28 is engageable by a cam ring 29, whereby the sleeve 27 can be moved to allow the collet to spread to release or receive a workpiece. Further movement of the cam ring 29 allows the collet to close to grip such a workpiece. An ejector bar 30 is also actuated by the cam ring 29. Since the cam ring 29 is mounted upon the part 19 while the remainder of the chuck 17 is mounted upon the head 16, indexing of the head, resulting in rotation of the head relatively to the part 19, will cause the chucks 17 to be opened and closed each time or at any desired time when the head 16 is indexed.

In association with the attachment illustrated and described, there is provided a known form of device 36 whereby workpieces can be successively transferred from the chuck 12a at one of the stations or positions occupied by the chucks on the main workpiece holder, to a chuck 17 at the uppermost of the stations of the head 16, as illustrated in FIG. 1. The transfer device 36 is angularly movable so that its end which carries a workpiece gripping device can be moved from alignment with the chucks on the main workpiece holder 12 of the machine to those of the attachment. Mechanism is provided whereby the workpiece is rotated through 180° so that portion thereof which was previously inaccessible becomes accessible when fitted into the attachment. Machining operations upon the workpieces held in the attachment are performed by tools carried by additional tool holders (not shown) located on housing 32 of the machine.

In use, the workpieces are inserted into the chucks 12a of the workpiece holder of the machine and are successively moved between the stations while machining operations are performed thereupon. When the workpieces reach the station adjacent to the transfer device 36, this device is actuated to transfer them to the appropriate chuck 17 at the uppermost of the stations of the head 16 of the attachment, with turning of the workpieces taking place so that their previously inaccessible portions are exposed. The head 16 is then indexed through its successive positions, so that one or more machining operations can be performed thereon, and when the workpieces reach the fourth stations of the head 16, they are ejected, thus providing an empty chuck 17 at the first station, ready to receive a further workpiece transferred by the transfer device from the station adjacent to the transfer device 36 on the machine.

It is to be understood that any number of stations may be provided upon the head 16, and furthermore, the workpiece may be transferred to the chuck 17 without being rotated so that further operations may be carried out upon the same side of the workpiece as was operated upon in the workpiece holder of the machine.

I claim:

1. A combined transfer and attachment device for an automatic lathe having a workpiece holder provided with at least one gripping device for a workpiece and a main actuating shaft, the combined transfer and attachment device comprising a head, a plurality of workpiece gripping devices on the head, support means securable to the lathe, means rotatably mounting the head on the support means, the gripping devices facing in the same direction as said at least one gripping device on the workpiece holder on the lathe, the axis of rotation of the head being parallel to, but off-set from the axis of rotation of the lathe workpiece holder, means actuable by the main actuating shaft on the lathe for indexing the head about its axis between a plurality of successive positions, and a transfer means for transferring the workpiece from the at least one gripping device of the lathe workpiece holder to a workpiece gripping device on said head, and at the same time turning the workpiece through approximately 180° so that portions thereof inaccessible for operating thereon when the workpiece is in the lathe workpiece holder, become accessible, when held in a gripping device of the head, for one or more operations to be performed thereupon.

2. The attachment as claimed in claim 1 in which the means for indexing the head comprises a geneva wheel mechanism actuated from the main actuating shaft of the lathe, and arranged to engage the head at timed intervals to index the head about its axis in timed sequence with mechanism for actuating the workpiece holder of the lathe.

3. A combined transfer and attachment device for an automatic lathe having a workpiece holder provided with at least one gripping device and a main actuating shaft, the combined transfer and attachment device including a head, a plurality of workpiece gripping devices on the head, support means securable to the lathe and upon which the head is rotatably mounted, the gripping devices being presented in the same direction as that on the workpiece holder on the lathe, with the axis of rotation of the head being parallel to, but off-set from that of the lathe workpiece holder, means adapted to be actuated by the main actuating shaft on the lathe for indexing the head about its axis between a plurality of successive positions, a transfer means for transferring workpieces from the lathe workpiece holder to said head, and at the same time turning them so that portions thereof inaccessible for operating thereon when in the lathe workpiece holder, becomes accessible, when held in the head, for one or more operations to be performed thereupon, and cam means arranged to actuate the workpiece gripping devices on the head, said cam means being actuated by rotation of the head, during indexing thereof about its axis.

4. A combined transfer and attachment device for an automatic multi-spindle lathe having a workpiece holder provided with a plurality of gripping devices for workpieces and a main actuating shaft, the combined transfer and attachment device comprising a head, a plurality of workpiece gripping devices on the head, support means securable to a lathe, means rotatably mounting the head upon the support means, the gripping devices facing in the same direction as the gripping devices on the workpiece holder on the lathe, the axis of rotation of the head being parallel to, but off-set from the axis of rotation of the workpiece holder of the lathe, means actuable by the main actuating shaft of the lathe for indexing the head about its axis between a plurality of successive positions, and a transfer means for transferring workpieces from the gripping devices of the lathe workpiece holder to the gripping devices of said head, and at the same time turning the workpieces through 180° so that portions thereof, inaccessible for operation thereof when in the gripping devices of the lathe workpiece holder, become accessible when held in the gripping devices of the head, for one or more operations to be performed thereupon.

5. The attachment as claimed in claim 1 including means arranged to actuate the workpiece gripping devices on the head, with said last named means being actuable by rotation of the head, during indexing of the head about its axis.

* * * * *